United States Patent
Bagley

(10) Patent No.: US 6,572,978 B1
(45) Date of Patent: *Jun. 3, 2003

(54) METHOD OF MAKING WOOD COMPOSITION BOARDS RESISTANT TO WATER PERMEATION

(76) Inventor: Brian G. Bagley, 16474 W. River Rd., Bowling Green, OH (US) 43402

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/668,598

(22) Filed: Jun. 19, 1996

Related U.S. Application Data

(63) Continuation of application No. 08/248,440, filed on May 24, 1994, now abandoned.

(51) Int. Cl.[7] .............................. B05D 3/02; B32B 21/00
(52) U.S. Cl. ....................... 428/513; 427/393; 427/396; 427/440; 427/387; 428/452
(58) Field of Search ................................. 427/387, 393, 427/396, 440; 428/391, 447, 452, 513

(56) References Cited

U.S. PATENT DOCUMENTS

| | | | |
|---|---|---|---|
| 3,245,918 A | 4/1966 | Burzynski | 252/448 |
| 3,257,330 A | 6/1966 | Burzynski et al. | 252/316 |
| 3,354,095 A | 11/1967 | Burzynski et al. | 252/316 |
| 3,389,114 A | 6/1968 | Burzynski et al. | 260/32.8 |
| 3,389,121 A * | 6/1968 | Burzynski et al. | 260/46.5 |
| 3,395,117 A | 7/1968 | Burzynski et al. | 260/46.5 |
| 3,449,293 A | 6/1969 | Burzynski et al. | 260/46.5 |
| 3,451,838 A | 6/1969 | Burzynski et al. | 117/33.3 |
| 3,496,126 A | 2/1970 | Burzynski et al. | 260/9 |
| 3,628,985 A | 12/1971 | Hider et al. | 117/46 |
| 4,223,121 A | 9/1980 | Burzynski | 528/12 |
| 4,304,820 A * | 12/1981 | Deubzer et al. | 428/452 |
| 4,338,375 A * | 7/1982 | Hashimoto et al. | 428/412 |
| 4,835,057 A * | 5/1989 | Bagley et al. | 428/391 |
| 4,877,654 A * | 10/1989 | Wilson | 427/387 |
| 4,885,186 A | 12/1989 | Bagley et al. | 427/38 |
| 4,913,972 A * | 4/1990 | Grunewalder et al. | 428/425.5 |
| 5,073,195 A * | 12/1991 | Cuthbert et al. | 106/2 |
| 5,194,341 A | 3/1993 | Bagley et al. | 429/189 |
| 5,300,327 A * | 4/1994 | Stark-Kasley et al. | 427/387 |

OTHER PUBLICATIONS

Encyclopedia of Chemical Technology, Kirk–Othmer, "Laminated Wood–Based Composites to Mass Transfer", John Wiley & Sons, 3rd ed. vol. 14 1981 pp 17–41.*
*Encyclopedia of Chemical technology*, Kirk–Othmer, Laminated Wood–Based Composites to Mass Transfer, John Wiley & Sons, 3 ed., vol. 14, 1981.

* cited by examiner

*Primary Examiner*—Brian K. Talbot
(74) *Attorney, Agent, or Firm*—MacMillan, Sobanski & Todd, LLC

(57) ABSTRACT

Water resistant wood composition boards and methods of making the boards by coating or impregnating the panels with a solvent soluble, further curable, partial condensation product of a methyltrialkoxy silane or a phenyl trialkoxy silane or mixtures thereof or ladder-type organosilsesquioxane polymers.

20 Claims, No Drawings

METHOD OF MAKING WOOD COMPOSITION BOARDS RESISTANT TO WATER PERMEATION

This application is a continuation of application Ser. No. 08/248,440, filed on May 24, 1994, now abandoned.

This invention relates to water resistant wood composition boards and methods of making the boards by coating or impregnating the panels with a solvent soluble, further curable, partial condensation product of a methyltrialkoxy silane or a phenyl trialkoxy silane or mixtures thereof or ladder-type organosilsesquioxane polymers as described in the Bagley et al. U.S. Pat. No. 4,835,057.

BACKGROUND OF THE INVENTION

Wood-based composite panels such as particle boards are used as paneling and siding in indoor and outdoor construction.

Low cost construction products such as inside paneling and outside siding are currently manufactured by printing and/or embossing an inexpensive sheet, or piece, of fiberboard (hardboard). The low-cost fiberboard, however, is sensitive to moisture and water reaching fiberboard through the exposed surface is the current quality problem which limits the useful product lifetime. Current practice is to coat an exposed surface with a thin organic plastic coating. This coating can be either a thermoset or uv-cure, but thermosets are generally used to reduce the cost (thermoset resins are cheaper). Much of the paneling is used in showers and tub areas and, of course, outside siding is exposed to the weather. Current practice provides marginally adequate protection against water so product lifetime is marginally adequate.

The present invention is directed to increasing the product lifetime of wood composition board construction products (e.g., paneling and siding) by reducing the permeability of water through use of a siloxane coating or impregnation. The best candidate is an organosilsesquioxane (ladder siloxane) having methyl ($CH_3$) pendant groups (prepared preferably from methyl triethoxysilane), as this material has the highest volume fraction of $SiO_{1.5}$. However, ladder siloxanes with other pendant groups (e.g., phenyl) or mixtures (e.g., methyl and phenyl) are also candidates. In addition, admixture of linear siloxanes and/or linear organic polymers can be added to the ladder siloxane (if they are all soluble in the same organic solvent) so as to achieve a particular property (e.g., coating flexibility). However, such additions will increase the permeability of water, and in the limit of having 100% organic polymer that is generally current practice. The ladder siloxanes can be either thermosets or uv-cured, but the thermosets are less expensive and completely compatible with the current product manufacturing process. The resins are solid at room temperature and soluble in organic solvents to a controllable viscosity. Because it is the wood composition board that needs protection, the siloxane can be applied in a number of places in the manufacturing sequence. As examples: the resin could be a component in the manufacture of the board (binding the wood fibers together); it could be impregnated in the board after its manufacture; it could be a coating on the board prior to design printing; it could be a replacement for the final organic coating now used, or it could be a final coating on top of the current practice. One added benefit of having it as a final coating is that the high $SiO_{1.5}$ content of the ladder siloxanes gives them better abrasion resistance than organic coatings—an advantage in cleaning installed paneling.

It is desired to have wood composition boards that have increased resistance to permeation by water and resultant deterioration.

OBJECT OF THE INVENTION

It is an object of the present invention to provide a method of treating wood composition boards to reduce the penetration of water therethrough by coating or impregnating the panels with a solvent soluble, further curable organosilsesquioxane polymer of the formula shown in an idealized structure:

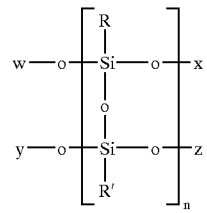

wherein R and R' may be the same and are selected from the group consisting of:
a) aliphatic hydrocarbons of 1–4 carbon atoms;
b) a phenyl radical;
c) a phenyl radical substituted with hydroxy or halogen groups; and
d) halogen groups, provided that R and R' are not both halogens;
w, x, y, and z are functional groups selected from the group consisting of alkoxy groups of 1–4 carbon atoms, halogen atoms, hydroxyl groups and silanol groups, and n is an integer ranging from 10–200.

It is an object of the present invention to provide a water-resistant wood composition board treated by coating or impregnating a hydrolysis and a partial condensation reaction product of a solvent soluble organopolysiloxane which is the reaction product of methyl triethoxysiloxane and water or a mixture of a methyl triethoxy silane and phenyl triethoxy silane and water.

It is an object of the present invention to provide wood composition boards that are used in panel construction or as siding, the panels being coated or immersed in a solvent soluble, further curable, hydrolysis and partial condensation product that is an organosilsesquioxane polymer including an organopolysiloxane resin made from methyl triethoxysilane or a mixture of phenyl triethoxysilane and methyl triethoxysilane.

It is an object of the present invention to provide a method of treating wood composition boards to reduce the penetration of water therethrough by coating or impregnating the boards with a solvent soluble, further curable organopolysiloxane resin that is a hydrolysis and partial condensation product of water and (A) methyl trialkoxy silane, or (B) a mixture of (A) and a phenyl trialkoxy silane.

These and other objects of the invention will be apparent from the specification that follows and the appended claims.

SUMMARY OF THE INVENTION

The invention provides a method of treating wood composition boards to reduce the penetration of water therethrough by coating or impregnating the panels with a solvent soluble, further curable organosilsesquioxane polymer of the formula:

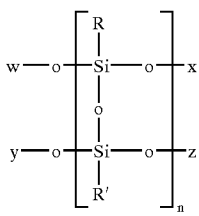

wherein R and R' may be the same and are selected from the group consisting of:
a) aliphatic hydrocarbons of 1–4 carbon atoms;
b) a phenyl radical;
c) a phenyl radical substituted with hydroxy or halogen groups; and
d) halogen groups, provided that R and R' are not both halogens;
w, x, y, and z are functional groups selected from the group consisting of alkoxy groups of 1–4 carbon atoms, halogen atoms, hydroxyl groups and silanol groups, and n is an integer ranging from 10–200.

The present invention provides a method of treating wood composition boards to reduce the penetration of water therethrough by coating or impregnating the panels with a solvent soluble, further curable organopolysiloxane resin that is a hydrolysis and partial condensation product of water and (A) methyl trialkoxy silane, or (B) a mixture of (A) and a phenyl trialkoxy silane.

The present invention also provides a wood composition board made by the above methods, the board being resistant to permeation by water.

The solvent soluble, further curable, hydrolysis and partial condensation product of methyl triethoxysilane is the preferred organopolysiloxane and is described in the Burzynski and Martin U.S. Pat. No. 3,389,114. A wood composition board, coated or immersed, is heated to cure the organopolysilane resin panel.

Also suitable is the solvent soluble further curable, hydrolysis and partial condensation product made from mixtures of methyl trialkoxysilane phenyl trialkoxysilane as described in U.S. Pat. No. 3,389,121. Suitable wood composition boards are disclosed to "Fiberboard Manufacturing Practices in the United States" by Otto Suchsland and George E. Woodson, United States Department of Agriculture, Forest Service, Agriculture Handbook No. 640, 1986.

Suitable laminated wood-based composites are also disclosed to Kirk-Othmer Encyclopedia of Chemical Technology, Vol. 14, entitled Laminated Wood-Based Composites to Mass Transfer, 1981, John Wiley & Sons, Inc., especially pages 17–41 incorporated by reference herein.

Useful wood-based fiber and particle panel materials include insulation boards, medium-density fiberboards, hardboards, particleboards, and laminated paperboards. Various particleboards are known by the kind of particle used such as flakeboard, chipboard, chipcore, or shavings board. These panel materials are reconstituted wood (or some other lignocelluloselike bagasse) in that the wood is first reduced to small fractions of the original size and then is combined by special forms of manufacture into large and moderately thick panels. In final form, these materials retain some of the properties of the original wood but, because of the manufacturing methods, gain new and different properties than those of the wood. Because they are manufactured, they can be tailored to satisfy desired uses.

The wood-based panel materials are manufactured either by converting wood substance to fibers and then interfelting them into the panel material classed as building fiberboard, or by strictly mechanical means of cutting or breaking wood into small discrete particles and then, with a synthetic-resin adhesive or other suitable binder (thermoset or thermoplastic), bonding them together in the presence of heat and pressure. These latter products are called particleboards.

Building fiberboards are made of fiberlike components of wood that are interfelted in the reconstitution and are characterized by a bond produced by the interfelting, and they are classified as fibrous-felted board products. Binding agents and other materials may be added during manufacture to increase strength, resistance to fire, moisture, or decay, or to improve some other property. Among the materials added are rosin, alum, asphalt (qv), paraffin, synthetic and natural resins, preservative and fire-resistant chemicals, and drying oils (qv). At certain densities and under controlled conditions of hot pressing, rebonding of the lignin effects an additional bond in the panel product.

Particleboards are manufactured from small components of wood that are glued together with a thermosetting synthetic resin or equivalent binder. Wax sizing is added to all commercially produced particleboard to improve water resistance. Other additives may be introduced during manufacture to improve some property or to provide added resistance to fire, insects (e.g., termites), or decay. Particleboard is among the newest of the wood-based panel materials. It has become a successful and economical panel product because of the availability and economy of thermosetting synthetic resins, which permit consolidation of blends of wood particles and the synthetic resin and curing in a heated press. The thermosetting resins that are used are primarily urea-formaldehyde and phenol-formaldehyde. Urea-formaldehyde is lowest in cost and is the binder used in greatest quantity for particleboard that is intended for interior or other nonsevere exposures. Where moderate water or heat resistance is required, melamine-urea-formaldehyde resin blends are used. For severe exposures, e.g., exteriors, or where some heat resistance is required, phenolics generally are used.

The kinds of wood particles that are used in the manufacture of particleboard range from specially cut flakes 2.5 cm or more in length (parallel to the grain of the wood) and only a few hundredths of a centimeter thick to fine particles approaching fibers or flour in size.

The synthetic resin solids usually are 5–10 wt % of the dry wood. These resins are set by heat as the wood particle-resin blend is compressed either in flat-platen presses (similar to those used for hot-pressing hardboard and plywood) or in extrusion presses where the wood-resin mixture is squeezed through a long, wide, and thin die that is heated to provide the energy to set the resin. Particleboards produced by flat-platen presses are call mat-formed or platen-pressed particleboards and those produced in an extrusion press are call extruded particleboards.

Broadly, the wood-based fiber panel materials (building fiberboards) are divided into two groups—insulation board (lower density products) and hardboard, which requires consolidation under heat and pressure as a separate step in manufacture. Insulation board and hardboard dimensional and quality requirements are given in refs. 13 and 14, respectively. The dividing point between an insulation board and a hardboard, on a density basis, is a specific gravity of 0.5 g/cm$^3$. Practically, because of the range of uses and specially developed products within the broad classification, further breakdowns are necessary to classify adequately the various products.

Laminated paperboards require a special classification because the density of these products is slightly greater than the maximum for non-hot-pressed, fibrous-felted, wood-based panel materials. Also, because these products are made by laminating plies of paper about 2.5 mm thick, they have different properties along the direction of the plies than across the machine direction. The other fibrous-felted products have nearly equal properties along and across the panel.

Mat-formed particleboards, because of differences in properties and uses, generally are classified by density into low (<0.50 g/cm$^3$), medium (0.59–0.80 g/cm$^3$), and high (>0.80 g/cm$^3$) categories. All mat-formed particleboards are hot-pressed to cure the resins that are used as binders.

These mat-formed particleboards are homogeneous (the same kind, size, and quality of particle throughout the thickness), graduated (a graduation of particle size from coarsest in the center of the thickness to finest at each surface), or three layer (the material on and near each surface is different than that in the core). These boards also may be described by the predominant kind of particle, as shavings, flakes, slivers, or the combination in the instance of layered construction as flake-faced or fines-surfaced boards.

There are two general-purpose structural insulating boards—building board and wallboard (the latter sometimes is called thin board because it is either 7.9- or 9.5-mm thick, whereas most other insulating board is 13-mm thick or thicker). Both general-purpose boards may be converted for a multiplicity of uses not specifically covered in the other products. The general-use boards usually are furnished with a factory-applied flame-resistant finish. Building board is 13-mm thick and may be obtained in panels 1.2×2.4, 2.7, 3.0, or 3.7 m with square edges. Wallboard is furnished regularly 1.2 m wide in either 2.4- or 3.0-m lengths. Quality limits are set for these and other regular products in the standards.

Medium density hardboard, formerly classified as medium density building fiberboard, is a relatively new wood-based panel product. Nearly all of the material being manufactured by the conventional methods that are used for other hardboard is being tailored for use as house siding. Medium density hardboard for house siding use is 9.5- and 11-mm thick and is fabricated for application as either panel or lap siding. Medium density hardboard sometimes is manufactured by a process that involves radio-frequency energy for curing thicker panels (usually about 19 mm although it is possible to make panels as thick as 76 mm) used mainly in furniture and cabinets as core stock or panel stock.

Panel siding is 1.2 m wide and commonly is furnished in 2.4-, 2.7-, or 3.0-m lengths. Surfaces may be grooved 51 mm or more on center parallel to the long dimension to simulate reversed board and batten or may be pressed with ridges simulating a raised batten. Lap siding usually is 30-cm wide with lengths to 4.9 m and is applied in the same way as conventional wood lap siding.

Medium density hardboard that is manufactured using radio-frequency curing is produced from dry, fiber-resin blends. The mats are pressed between heated platens where the high frequency heat provides additional heat energy to cure the resin binder (usually urea-formaldehyde instead of the phenolics used with the more conventional hardboards); the product is S-2-S hardboard.

Commercial thicknesses of high density hardboard generally range 9.5–13 mm. Not all thicknesses are produced in all grades. The thicknesses of 2.5 and 2.1 mm are produced regularly only in the standard grade. Tempered hardboards are produced regularly in thicknesses of 3.2–7.9 mm.

Important prospectus for mat-formed particleboards are:

| Property | Low density particleboard | Medium density particleboard | High density particleboard |
| --- | --- | --- | --- |
| density, g/cm$^3$ | 0.40–0.59[b] | 0.59–0.80 | 0.80–1.12 |
| modulus of elasticity (bending), MPa[c] | 1.0–1.7[b] | 1.7–4.8 | 2.4–6.9 |
| modulus of rupture, MPa[c] | 5.5–9.7[d] | 11.0–55.2 | 16.6–51.7 |

[b]Lower limit is for boards as generally manufactured: lower density products with lower properties may be made.
[c]To convert MPa to psi, multiply by 145.
[d]Only limited production of low density particleboard so values presented are specification limits.

The present invention provides a superior, outstanding, water-resistant wood composition board and methods of making the board.

What is claimed is:

1. A method of treating wood composition boards to reduce the penetration of water therethrough comprising the steps of:
   providing a wood composition board;
   providing an organic solvent soluble, further curable resin consisting essentially of:
   a ladder organosilsesquioxane polymer of the formula:

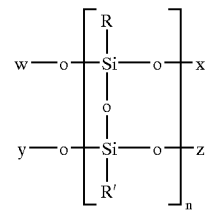

wherein R and R' may be the same or different and are selected from the group consisting of:
   a) aliphatic hydrocarbons of 1–4 carbon atoms;
   b) a phenyl radical;
   c) a phenyl radical substituted with hydroxy or halogen groups; and
   d) halogen groups, provided that R and R' are not both halogen;
      w, x, y, and z are functional groups selected from the group consisting of alkoxy groups of 1–4 carbon atoms, halogen atoms, hydroxyl groups and silanol groups, and n is an integer ranging from 10–200, and optionally including a curing a catalyst, inert elements, dyes, coloring agents or fillers;
   coating or impregnating said wood composition board with said organic solvent soluble, further curable resin; and
   curing said organic solvent soluble, further curable resin to reduce the penetration of water there through.

2. A method as defined in claim 1 in which the organosilsesquioxane is prepared by the hydrolysis and condensation polymerization of methyltriethoxysilane.

3. A method as defined in claim 1 in which the organosilsesquioxane is prepared by the hydrolysis and condensation polymerization of a mixture of methyl- and phenyl-triethoxysilane.

4. A method as defined in claim 3 in which a curing catalyst is added to the resin.

5. A method as defined in claim 4 in which the catalyst is tetramethylammonium hydroxide 2–6% by weight and formic acid 3–9% by weight.

6. A method as defined in claim 1 in which the organosilsesquioxane is an ultraviolet curable resin.

7. A method as defined in claim 1 in which the organosilsesquioxane, before coating or impregnation, is dissolved in an organic solvent.

8. A method as defined in claim 7 in which the organic solvent is a solution of n-butanol, ethyl alcohol and water.

9. A product produced by the process of claim 1.

10. A product as defined in claim 9 in which the organosilsesquioxane is a methyltriethoxysiloxane having a high volume fraction of $SiO_{1.5}$.

11. A product as defined in claim 9 in which the organosilsesquioxane is prepared by the hydrolysis and condensation polymerization of a mixture of methyl- and phenyl-triethoxysilane.

12. A method as defined in claim 1 in which there is the further step of curing the organosilsesquioxane.

13. A cured product produced by the method of claim 12.

14. A method of treating wood composition boards to reduce the penetration of water therethrough by coating or impregnating the panels with an organic solvent soluble, further curable resin consisting essentially of:
    a ladder-type organopolysiloxane polymer that is a hydrolysis and partial condensation product of water and (A) methyl trialkoxy silane or (B) a mixture of A and a phenyl trialkoxy silane, and
    optionally including a curing catalyst, inert elements, dyes, coloring agents or fillers.

15. A method as defined in claim 14 in which the silane is a methyl triethoxy silane.

16. A method as defined in claim 14 in which the silane is a mixture of methyl and phenyl triethoxy silanes.

17. A method as defined in claim 14 in which the composition board is a particle board comprising wood particles and a thermoset synthetic resin.

18. A method as defined in claim 14 in which the organopolysiloxane, before coating, is a solution in n-butanol, ethyl alcohol and water.

19. A product produced by the process of claim 14.

20. A water permeable resistant wood composition board comprising:
    a hydrolysis and a partial condensation reaction product of a solvent soluble organopolysiloxane which is the reaction product of methyl triethoxysilane and water or a mixture of a methyl triethoxy silane and phenyl triethoxy silane and water; and
    a wood composition board impregnated or coated with said hydrolysis and partial condensation reaction product to provide a wood composition board resistant to water permeation.

* * * * *